United States Patent [19]
Hawkenson

[11] Patent Number: 5,025,615
[45] Date of Patent: Jun. 25, 1991

[54] SCARIFIER ATTACHMENT FOR CHAIN SAW

[76] Inventor: Bruce R. Hawkenson, 1667 Rebman Crescent, Prince George, British Columbia, Canada, V2L 4Z9

[21] Appl. No.: 500,396

[22] Filed: Mar. 27, 1990

[51] Int. Cl.⁵ .................. A01D 51/00; B27B 23/00
[52] U.S. Cl. ........................ 56/12.7; 172/96; 172/45; 172/41; 144/1 F; 144/208 J; 56/295
[58] Field of Search .............. 172/96, 91, 45, 41, 172/15, 16; 56/295, 12.7, 256; 30/122; 144/1 F, 208 J

[56] References Cited

U.S. PATENT DOCUMENTS

| | | | |
|---|---|---|---|
| 2,575,223 | 11/1951 | Madill . | |
| 2,654,986 | 10/1953 | Gold | 56/295 |
| 2,707,859 | 5/1955 | Walker | 172/15 |
| 2,718,743 | 9/1955 | Smith | 56/256 |
| 2,791,077 | 5/1957 | Lyle | 172/15 |
| 2,816,495 | 12/1957 | Brooks' | 172/41 |
| 2,821,216 | 1/1958 | West et al. | 56/12.7 |
| 3,190,064 | 6/1965 | Wenzel | 172/15 |
| 3,208,209 | 9/1965 | Dunlap | 56/295 |
| 4,479,303 | 10/1984 | Gardner | 30/122 |
| 4,805,389 | 2/1989 | Hawkenson | 30/122 |

FOREIGN PATENT DOCUMENTS

| | | | |
|---|---|---|---|
| 1231034 | 1/1988 | Canada . | |
| 498316 | 1/1936 | United Kingdom | 172/45 |
| 1221765 | 2/1971 | United Kingdom . | |

OTHER PUBLICATIONS

Sales Brochure Entitled "Hawk Power Scalper".
Sales Brochure Entitled "Hawk Power Scalper-Ecological Scarification".

*Primary Examiner*—Richard J. Johnson
*Attorney, Agent, or Firm*—John R. Uren

[57] ABSTRACT

A hub and tine assembly for a rotary debris remover is provided which comprises a hub which is rotatable about a shaft and a plurality of tine members which are arranged symmetrically around the rotation axis of the hub. The tine members are pivotally connected to the hub at locations which follow a circular rotation path around the rotation axis of the hub when the hub is rotated. Each tine member has at least one tine which projects from the hub. The tine member has a centre of gravity which is located so that the tine is offset from the radial direction when the hub is rotated and displaced in a direction which corresponds with the direction of rotation so that the tine can effect a "punching" effect on debris in its path.

13 Claims, 5 Drawing Sheets

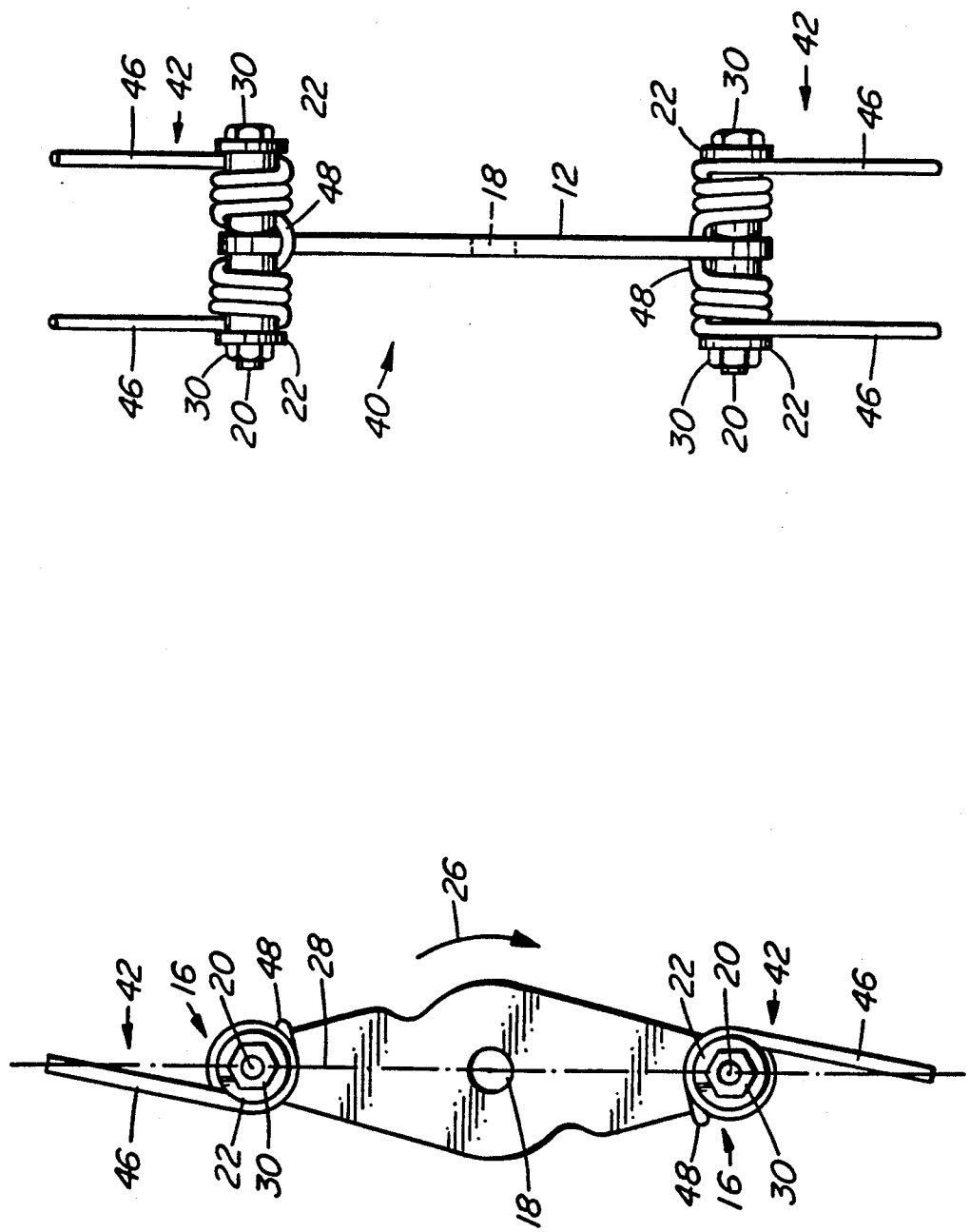

SCARIFIER ATTACHMENT FOR CHAIN SAW

INTRODUCTION

This invention relates to a scarifier or rotary debris remover. In particular it relates to an improved hub and tine assembly for a handheld scarifier of the type that can be attached to a power-driven chainsaw.

BACKGROUND OF THE INVENTION

Handheld scarifiers which are powered by portable power sources, such as chainsaws, are known. For example, Canadian Patent No. 1,231,034 describes a rotary debris remover which forms an attachment to a chainsaw and comprising a hub driven by the chainsaw motor and provided with a plurality of flexible spring steel tines extending radially outwardly from the centre of rotation of the hub. The tines are fixedly anchored to the hub. While this scarifier has been found to be effective, it has nevertheless been found that the tines are prone to breaking on impacting hard objects, such as rocks, and the broken tines must be replaced which requires interruption of the operation of the debris remover.

It is accordingly an object of the present invention to provide a rotary debris remover which alleviates the above-mentioned difficulties and which has further advantages which will become apparent from the following description.

SUMMARY OF THE INVENTION

According to the invention there is provided a rotary debris remover which includes a hub rotatable about a rotation axis; a tine member pivotally connected to the hub at a location which follows a circular rotation path around the rotation axis of the hub when the hub is rotated; the tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub. It has been found that with this arrangement it is not necessary to anchor the tine on the hub because at the speeds of rotation encountered in rotary debris removers, i.e. from about 1000 to 5000 rpm, it is the mass of the tip of the tine which does the work and not the anchoring of the tine to the hub which is important. At the same time, the tine is less prone to breaking because it is not fixedly anchored to the hub.

It has further been found that with the tine being displaced from the radial direction of the circular rotation path, i.e. the tine is offset in a forward direction from a line which is perpendicular to the circular rotation path, a "punching" effect is obtained wherein the tine is punched into debris such as logs, etc., lying in its path, thereby facilitating breaking up of the debris. In this way, it has been found that a far more effective and speedy effect is obtained compared with the known debris removers, such as Canadian Patent No. 1,231,034, where the tines project perpendicularly, i.e. radially from the circular rotation path of the hub.

Preferably a plurality of tine members are arranged symmetrically around the rotation axis of the hub. In particular two, three or four tine members may be provided which are symmetrically arranged around the rotation axis of the hub.

Also according to the invention there is provided a manually portable rotary debris remover comprising a hub rotatable about a rotation axis; a power source for rotating the hub; a plurality of tine members arranged symmetrically around the rotation axis of the hub; the tine members being pivotally connected to the hub at locations which follow a circular rotation path around the rotation axis of the hub when the hub is rotated; each tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub.

Further according to the invention there is provided a hub and tine assembly for a rotary debris remover, comprising a hub having means for connecting the hub to a drive member for rotation of the hub about a rotation axis; a plurality of tine members arranged symmetrically around the rotation axis of the hub; the tine members being pivotally connected to the hub at locations which follow a circular rotation path around the rotation axis of the hub when the hub is rotated; each tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub.

Also according to the invention there is provided a rotary debris remover assembly for attachment to a chainsaw comprising a drive pulley for connection to the drive shaft of a chain saw; a driven pulley on a rotatable shaft which is spaced from the drive pulley; a driven pulley on the rotatable shaft; an endless belt around the drive and driven pulleys; a hub on the rotatable shaft; a plurality of tine members arranged symmetrically around the rotation axis of the hub; the tine members being pivotally connected to the hub at locations which follow a circular rotation path around the rotation axis of the hub when the hub is rotated; each tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub.

In a particular embodiment of the invention, the hub is elongate in shape and a tine member is located at each of its two opposite ends.

The pivotal connection of the tine member to the hub may include a tine shaft on the hub and the tine member may comprise a spring steel rod which is coiled around the tine shaft at a middle portion of the rod and terminating in a pair of tines at opposite ends of the coiled middle portion of the rod. The tines at the opposite ends of the tine member may diverge from each other or they may be superimposed on each other.

The tine shaft may project from opposite sides of the hub and a tine member may be located on the projecting tine shaft on each side of the hub. Alternatively, the coiled middle portion of the spring steel rod may include a bridge portion which extends over an edge of the hub from the one side thereof to the other, the tines of the tine member being located on the opposite sides of the hub.

DESCRIPTION OF THE DRAWINGS

The invention will now be described, by way of examples, with reference to the accompanying drawings, in which:

FIG. 3 is a side view of a hub and tine assembly according to another embodiment of the invention;

FIG. 4 is an end view of the hub and tine assembly of FIG. 3;

DESCRIPTION OF PREFERRED EMBODIMENTS

Figure 2:
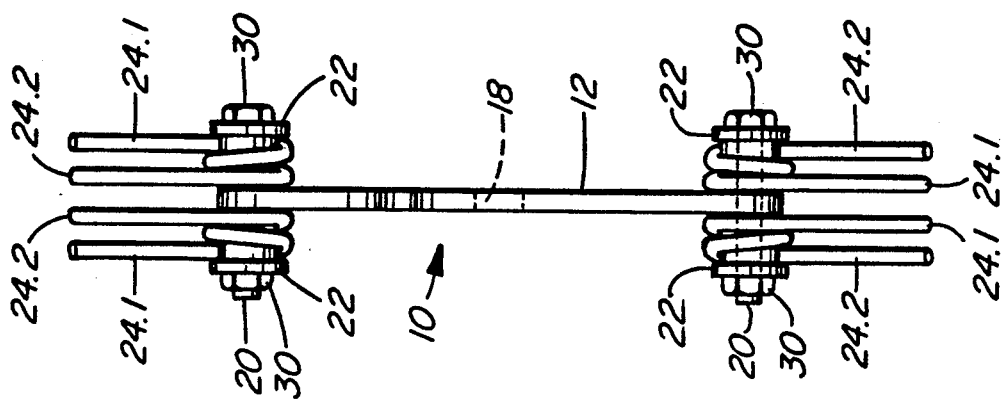
FIG. 2 is an end view of the hub and tine assembly of FIG. 1.
Figure 1:
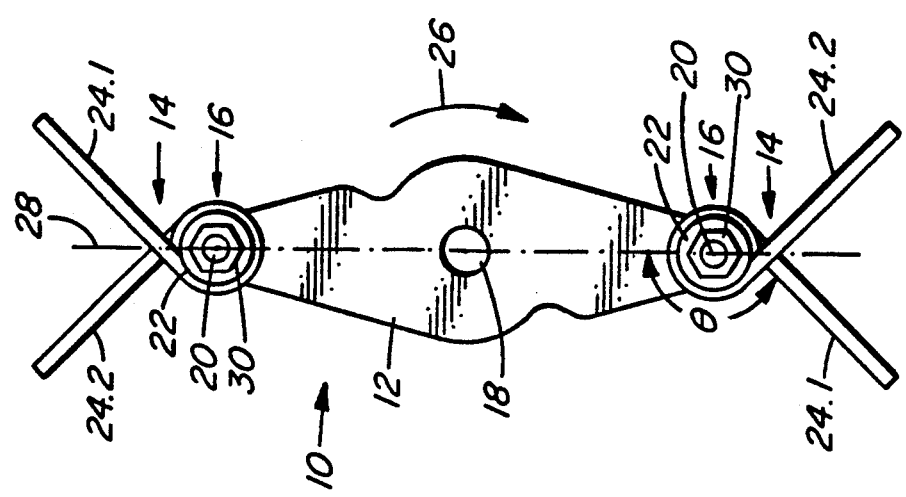
FIG. 1 is a side view of a hub and tine members of a rotary debris remover according to one embodiment of the invention.

Referring to FIGS. 1 and 2, reference numeral 10 generally indicates a hub and tine assembly comprising a hub or a tine holder 12, which is a flat elongate member, and a pair of tine members 14 pivotally connected at 16 to the opposite ends of the tine holder 12. The tine holder 12 has a central opening 18 for locating the tine holder 12 on a rotatable shaft which can be driven by a suitable handheld power source, such as a portable chainsaw as described in Canadian Patent No. 1,231,034, the contents of which is incorporated herein by reference.

At each pivotal connection 16, a tine axle 20 is provided which extends through the tine carrying member 12 and projects from the opposite sides thereof. A cylindrical tine bush 22 is provided around each of the ends of the tine shaft projecting from the opposite sides of the member 12. The tine members 14 comprise rods of spring steel which are coiled at their centre portions around the bushes 22 and terminating in tines 24.1 and 24.2 which project from the tine-carrying member 12. In the present embodiment, the tines 24.1 and 24.2 diverge from each other, as shown.

The direction of rotation of the tine and hub assembly 10 is shown by the arrow 26 in FIG. 1. When the member 12 is rotated, the pivotal connections 16 will follow a circular rotation path around the rotation axis of the hub 12. A broken line 28 has been drawn through the pivotal connections 16 and the rotation axis of the hub 12 and extensions of this line represent directions which are radially oriented with respect to the circular rotation path followed by the pivotal connections 16 when the hub 12 is rotated. Because the tine members 14 are symmetrical about their pivotal connections 16, they will tend to align themselves as shown in FIG. 1 under the action of the centrifugal forces which are operative when the member 12 is rotated. The tine members 24.1 and 24.2 are symmetrical about the broken line 28 and in particular the tines 24.1 are displaced from the line 28 in a forward direction, i.e. in the direction of rotation of the member 12, so that the angle $\theta$ is less than 180 degrees. Thus when the assembly 10 is employed in a rotary debris remover, the tine members 14, although they are not anchored to the member 12 but are capable of pivotal movement relative thereto, will align themselves as shown in FIG. 1 due to the action of centrifugal forces. In addition, the tines 24.1 at the opposite ends of the member 12 will be offset in the forward direction of rotation of the member 12 and will tend to "punch" into the debris and facilitate the breaking up and removal thereof. The purpose of the other tine 24.2 is simply to act as a counterweight to ensure that the tine 24.1 is correctly aligned. It will be appreciated that the tines 24.1 and 24.2 may not be of identical size. If the tine 24.2 is smaller than the tine 24.1, the angle of offset of the tine 24.1 will be smaller than illustrated in FIG. 1 and if the tine 24.2 is larger than the tine 24.1, the angle of offset will be larger. The purpose of the tine 24.2 is to locate the centre of gravity of the tine member 14 so that the tine 24.1 is forwardly offset from the radial direction during rotation of the tine-carrying member 12.

The tine bushes 22 may conveniently be located on the tine axles 20 by means of tine axle nuts 30.

As can be seen from FIG. 2, a pair of tine members 14 are provided at each of the opposite ends of the tine-carrying member 12 and located on opposite sides thereof.

Figure 5:
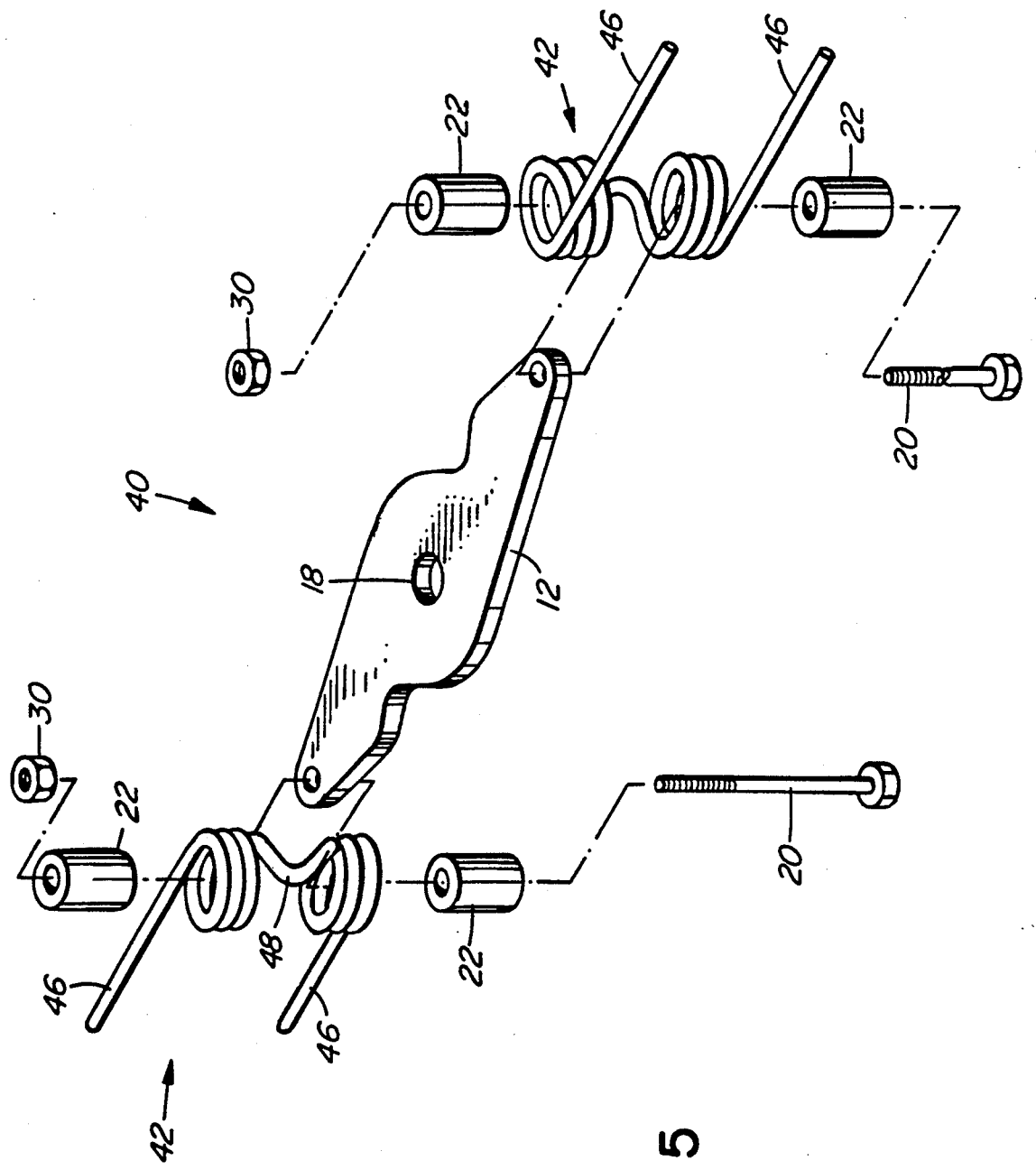
FIG. 5 is an exploded view of the hub and tine assembly of FIG. 3.

Referring now to FIGS. 3 to 5 of the accompanying drawings, a hub and tine assembly 40 according to another embodiment of the invention is shown. The assembly 40 also comprises a flat elongate tine-carrying member 12 having a central opening 18 for attachment to a rotatable axle but only one tine member 42 is located at each of the opposite ends of the tine-carrying member 12.

Each tine-carrying member 42 comprises a rod of spring steel which is coiled at its centre portion around a tine axle 20 which extends through the member 12 and terminating in tines 46 at its opposite ends, which tines 46 are superimposed on each other, as shown in FIG. 3.

The coiled portion of the tine member 42 has a bridge part 48 which extends over an edge of the member 12 from one side of the member 12 to the other side thereof. The bridge portions 48 are arranged so that they do not interfere with the ability of the tine member 42 to perform pivotal movement relative to the tine-carrying member 12. The direction of rotation is again indicated by means of an arrow 26 and a broken line 28 again indicates the radial direction with respect to the circular rotation path of the pivotal connections 16 of the tine members 42 to the tine-carrying member 12.

Each tine-carrying member 42 has a centre of gravity which is located so that the tine member 42, due to centrifugal forces acting thereon during rotation of the member 12, is positioned so that the tines 46 are displaced in a forward direction from the radial direction 28.

The operation of the assembly 40 is similar to that of the assembly 10 and the tines 46 will again perform a punching action facilitating the breaking up and removal of debris.

Figure 6:
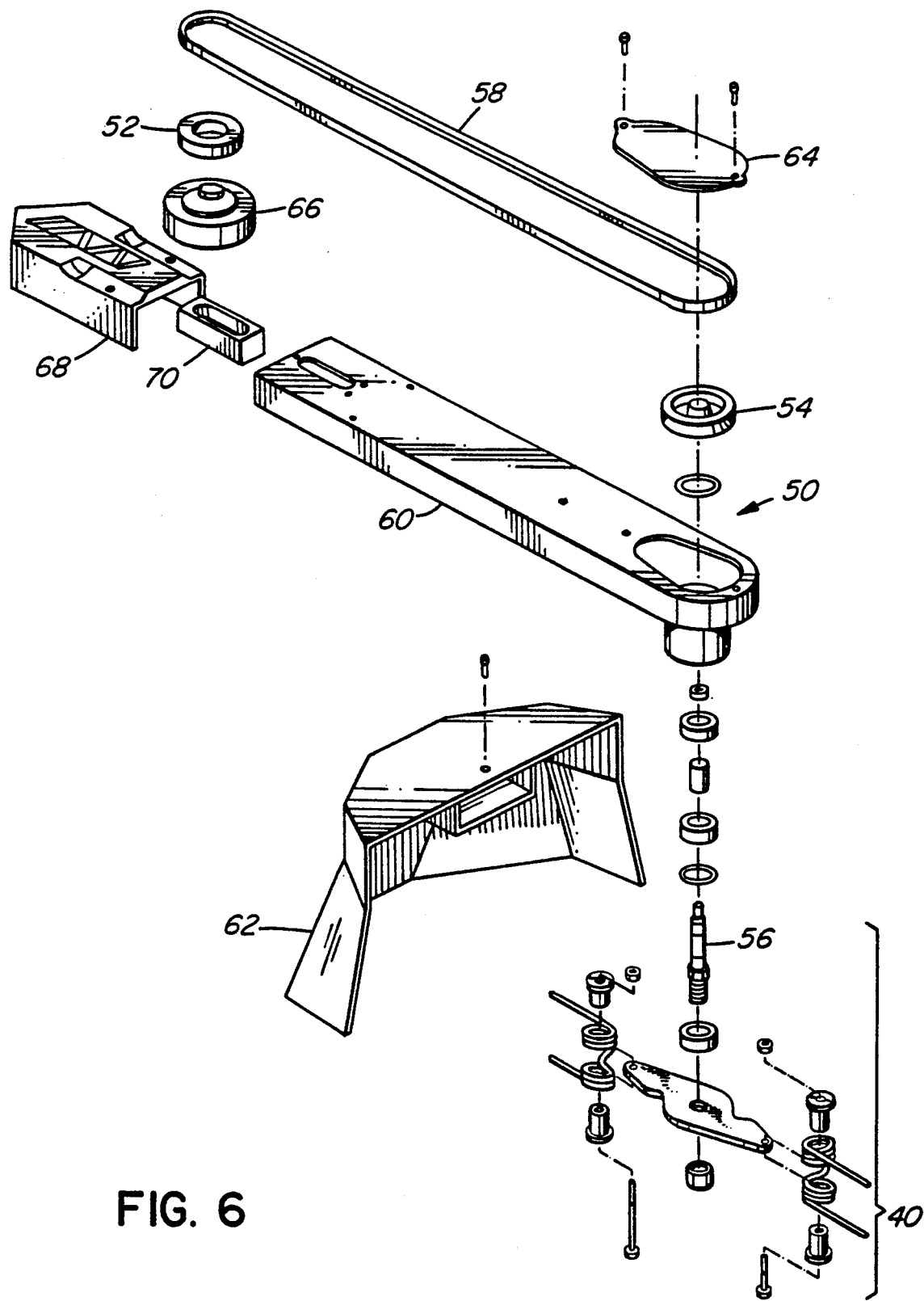
FIG. 6 is an exploded view on a smaller scale of a rotary debris remover assembly for attachment to a chain saw.

Referring to FIG. 6, an exploded view of a rotary debris remover assembly according to the invention is shown.

Figure 7:
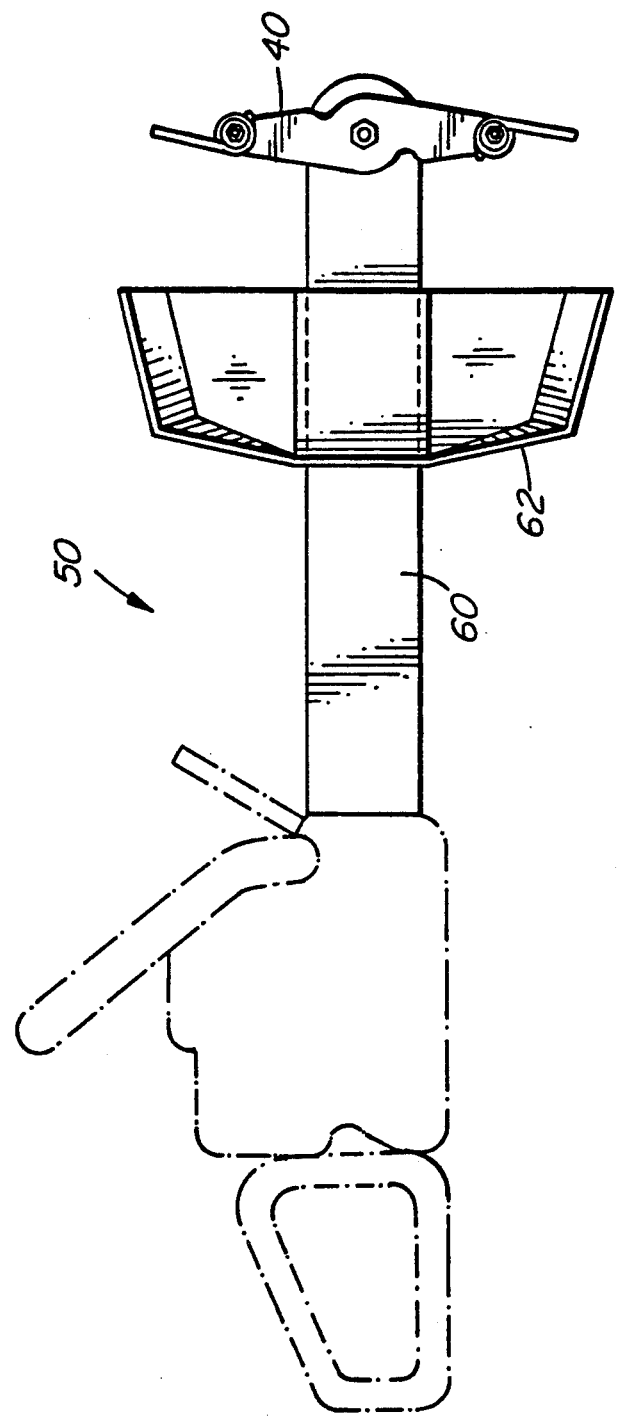
FIG. 7 is a side view showing the outline of a chainsaw to which the debris remover of FIG. 6 is attached.

The assembly 50 comprises a drive pulley 52 for attachment to the drive shaft of a manually portable chainsaw (FIG. 7), a driven pulley 54 on a rotatable shaft 56, which is spaced from the drive pulley 52, an endless belt 58 around the drive and driven pulleys and a hub and tine assembly 40 on the rotatable shaft 56.

The assembly 50 further includes an arm member 60, a debris guard 62 and a pulley cover 64.

At the end of the assembly 50 which is, in use, attached to the chainsaw, there is provided in addition to the drive pulley 52, a clutch disk 66 and clutch cover 68. Reference numeral 70 indicates a bar nut block.

The assembly 50 is provided as an attachment for a chainsaw.

In operation, the chainsaw is activated in the usual way thereby causing the chainsaw motor to rotate the hub and tine assembly 40. A site, such as a tree planting site, is cleared by simply contacting the rapidly rotating tines 24, 46 with debris, clods and vegetation in the site area.

While only preferred embodiments of the invention have been described herein in detail, the invention is not limited thereby and modifications can be made within the scope of the attached claims.

What is claimed is:

1. A portable rotary debris remover which includes a power means and operator handle means, a hub rotatable about a rotation axis; a tine member pivotally connected to the hub at a location which follows a circular rotation path around the rotation axis of the hub when the hub is rotated; the tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub.

2. A rotary debris remover according to claim 1, wherein a plurality of tine members, arranged symmetrically around the rotation axis of the hub, is provided.

3. A rotary debris remover according to claim 1, wherein the hub is elongate in shape and a tine member is located at each of its two opposite ends.

4. A rotary debris remover according to claim 1, wherein the pivotal connection includes a tine axle on the hub and the tine member comprises a spring steel rod which is coiled around the tine axle at a middle portion of the rod and terminating in a pair of tines at opposite ends of the coiled middle portion of the rod.

5. A rotary debris remover according to claim 4, wherein the tines at the opposite ends of the tine member diverge from each other.

6. A rotary debris remover according to claim 4, wherein the tines at the opposite ends of the tine member are superimposed on each other.

7. A rotary debris remover according to claim 4, wherein the tine axle projects from opposite sides of the hub and a tine member is located on the projecting tine axle on each side of the hub.

8. A rotary debris remover according to claim 4, wherein the tine shaft projects from opposite sides of the hub and the coiled middle portion of the rod includes a bridge portion which extends over an edge of the hub from the one side thereof to the other, the tines of the tine member being located on the opposite sides of the hub.

9. A manually operated portable rotary debris remover, comprising: a power means and operator handle means,
a hub rotatable about a rotation axis; a plurality of tine members arranged symmetrically around the rotation axis of the hub; the tine members being pivotally connected to the hub at locations which follow a circular rotation path around the rotation axis of the hub when the hub is rotated;
each tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub.

10. A hub and tine assembly for a rotary debris remover, comprising:
a hub having means for connecting the hub to a drive member for rotation of the hub about a rotation axis;
a plurality of tine members arranged symmetrically around the rotation axis of the hub; the tine members being pivotally connected to the hub at locations which follow a circular rotation path around the rotation axis of the hub when the hub is rotated;
each tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub, and wherein the pivotal connection includes a tine axle on the hub and the tine member comprises a spring steel rod which is coiled around the tine axle at a middle portion of the rod and terminating in a pair of tines at opposite ends of the coiled middle portion of the rod.

11. A hub and tine assembly according to claim 10, wherein the hub is elongate in shape and a tine member is located at each of its opposite ends.

12. A hub and tine assembly according to claim 10, wherein the tine shaft projects from opposite sides of the hub and the coiled middle portion of the rod includes a bridge portion which extends over an edge of the hub from the one side thereof to the other, the tines of the tine member being located on the opposite sides of the hub.

13. A rotary debris remover assembly for attachment to a chainsaw, comprising:
a drive pulley for connection to the drive shaft of a chain saw;
a driven pulley on a rotatable shaft which is spaced from the drive pulley;
a driven pulley on the rotatable shaft;
an endless belt around the drive and driven pulleys; a hub on the rotatable shaft;
a plurality of tine members arranged symmetrically around the rotation axis of the hub;
the tine members being pivotally connected to the hub at locations which follow a circular rotation path around the rotation axis of the hub when the hub is rotated;
each tine member having at least one tine which projects from the hub and the tine member having a centre of gravity which is located so that the tine member, due to centrifugal forces acting thereon during rotation of the hub, is oriented with the tine being displaced from a direction which is radially oriented with respect to said circular rotation path in a direction corresponding with the direction of rotation of the hub.

* * * * *